United States Patent [19]
Bacelon et al.

[11] Patent Number: 5,923,294
[45] Date of Patent: Jul. 13, 1999

[54] NAVIGATION SYSTEM ALLOWING REAL-TIME COORDINATION OF THE DISPLACEMENT OF MOBILES TRAVELLING OUT OF DIRECT LINE OF SIGHT

[75] Inventors: Olivier Bacelon, Paris; Gérard Auger, Campagne sur Oise; Claude Michel, Asnieres, all of France

[73] Assignee: Thomas - CSF, Paris, France

[21] Appl. No.: 08/973,744

[22] PCT Filed: Jun. 21, 1996

[86] PCT No.: PCT/FR96/00975

§ 371 Date: Dec. 22, 1997

§ 102(e) Date: Dec. 22, 1997

[87] PCT Pub. No.: WO97/01104

PCT Pub. Date: Jan. 9, 1997

[30] Foreign Application Priority Data

Jun. 23, 1995 [FR] France .................................. 95 07586

[51] Int. Cl.$^6$ ........................................................ G01S 3/02
[52] U.S. Cl. .............................................................. 342/457
[58] Field of Search ....................................... 342/357, 457

[56] References Cited

U.S. PATENT DOCUMENTS

| | | |
|---|---|---|
| 4,731,724 | 3/1988 | Michel et al. . |
| 4,945,312 | 7/1990 | Auger et al. . |
| 5,307,509 | 4/1994 | Michalon et al. . |
| 5,317,321 | 5/1994 | Sass ........................................ 342/357 |
| 5,353,134 | 10/1994 | Michel et al. . |
| 5,379,140 | 1/1995 | Michel et al. . |
| 5,386,308 | 1/1995 | Michel et al. . |
| 5,389,934 | 2/1995 | Kass ....................................... 342/357 |
| 5,416,633 | 5/1995 | Michel et al. . |
| 5,579,165 | 11/1996 | Michel et al. . |
| 5,675,112 | 10/1997 | Giry et al. . |
| 5,689,269 | 11/1997 | Norris ..................................... 342/357 |

*Primary Examiner*—Gregory C. Issing
*Attorney, Agent, or Firm*—Oblon, Spivak, McClelland, Maier & Neustadt, P.C.

[57] ABSTRACT

A navigation system having a terminal provided at each mobile station. Each terminal includes a locator for locating a mobile station, a display for displaying its travel relative to the reference direction, an indicator to indicate a common reference direction to both mobile stations with the indicator being coupled to the display, a travel data communicator and a processor to process data from the indicator, the locator and the communicator and display it on the display. At least one of the two mobile stations further includes a display for displaying the travel of the second mobile station relative to the first and an input unit for inputting a predetermined angle for defining how the direction of travel of the second mobile station should be corrected relative to the new direction of travel of the first mobile station. The correction is transmitted to the second mobile station by the travel data communicator of the first and second mobile stations.

20 Claims, 3 Drawing Sheets

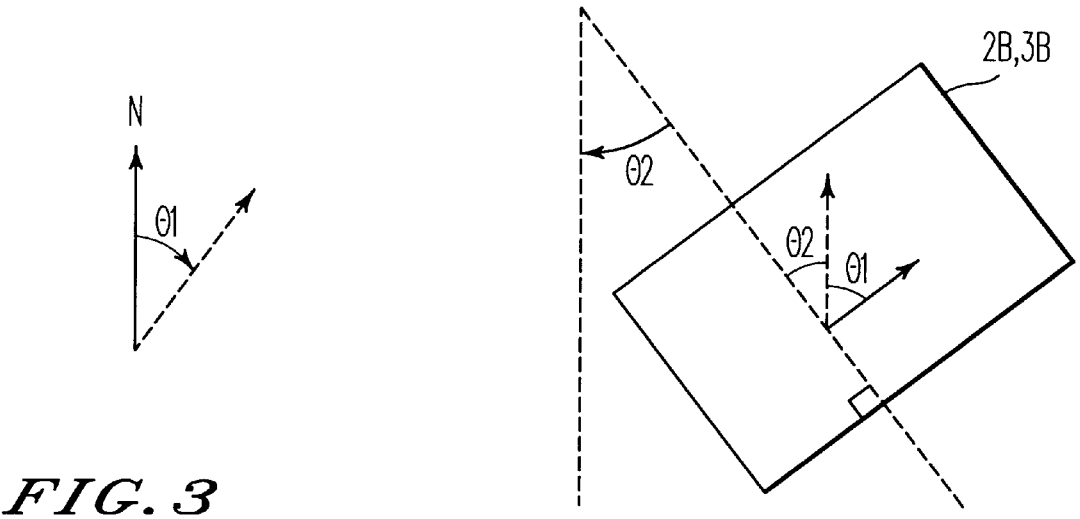
FIG. 3
FIG. 4
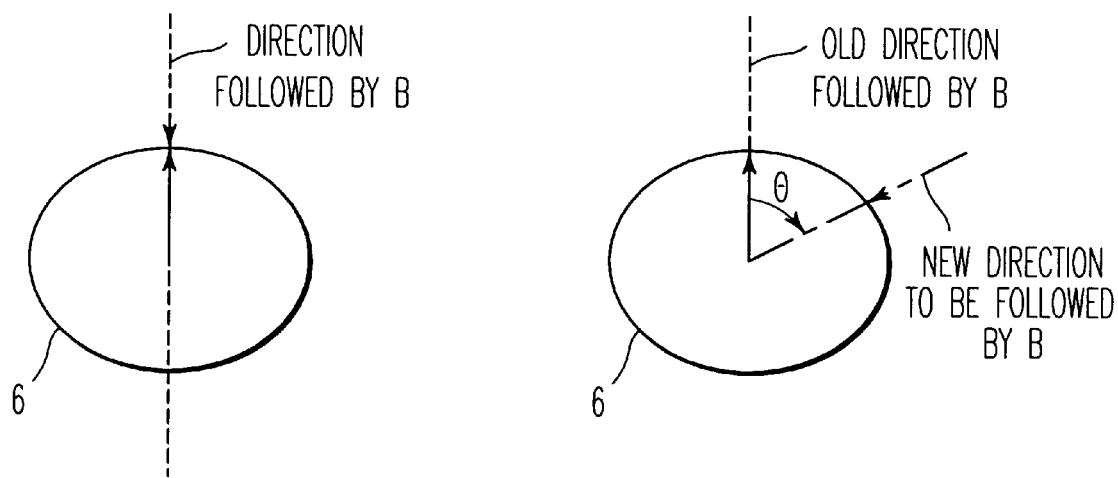
FIG. 5a
FIG. 5b

NAVIGATION SYSTEM ALLOWING REAL-TIME COORDINATION OF THE DISPLACEMENT OF MOBILES TRAVELLING OUT OF DIRECT LINE OF SIGHT

BACKGROUND OF THE INVENTION

1. Field of the Invention

The present invention relates to a navigation system allowing real-time coordination of the displacement of at least two mobiles travelling out of direct line of sight. A first mobile regularly indicates to a second distant mobile the new direction of progress to be followed, and does so without using any visible or audible transmission system.

The present invention applies more particularly to the context of an infantry combatant on the battle field. It enables, for example, a group leader, continuously aware of the position of the members of the combat group, to coordinate their displacement as a function of his own displacement.

2. Discussion of the Background

Known systems currently use either means of direct voice transmission, radio means for example, or visual means, via gestures, sets of lights, smoke signals, flags, etc.

These various means are not, on the one hand, completely stealthy, and on the other hand, may quickly run into difficulty on account of the relief of the terrain and/or the meteorological conditions.

SUMMARY OF THE INVENTION

The objective of the present invention is to alleviate the aforesaid drawbacks.

To this end, the subject of the invention is a navigation system allowing real-time coordination of the displacement of at least two distant mobiles travelling out of direct line of sight, characterized in that it includes a terminal arranged on each mobile respectively, each terminal including:

a means of location of the mobile, a means of display of its progress with respect to a common reference direction, a means which indicates to the two mobiles a common reference direction and is coupled to the display means, a means of communication of progress data, and a means of processing the information delivered by the means which indicates to the two mobiles the common reference direction, the locating means and the communication means so as to display them on the display means, and in that at least one of the two mobiles furthermore includes:

a means of display of the progress of the second mobile with respect thereto, and a facility for inputting a specified angle defining the correction to be made to the direction of progress of the second mobile with respect to the new progress of the first mobile, this correction being transmitted to the second mobile by way of the communication means respective to the first and second mobiles.

The system according to the invention has the advantage of combining easily implemented means of location, communication and display, and furnishes a navigation system whose man/machine interface is ergonomic and user-friendly, and especially well suited to the context in which the mobiles are pedestrians.

BRIEF DESCRIPTION OF THE DRAWINGS

Other advantages and characteristics of the present invention will emerge more clearly on reading the description which follows and the appended figures which represent:

FIGS. 5a and 5b, the illustration of the method used by the mobile A to input the new direction to be followed by the mobile B, FIG. 6, an architecture of a wrist terminal according to the invention, borne by the mobile A, and FIG. 7, an illustration of the input of a new angle of orientation on the wrist terminal of the mobile A.

DISCUSSION OF THE PREFERRED EMBODIMENTS

Figure 1:
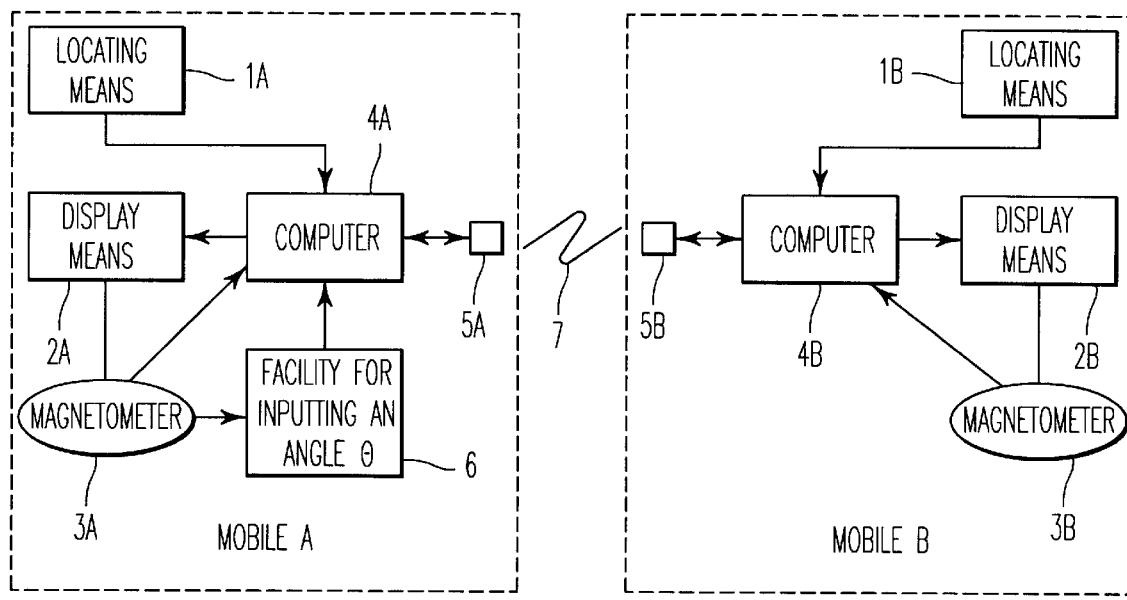
FIG. 1, a functional diagram of the navigation system according to the invention, FIG. 2, an example of display, by the mobile A, of its means of display of the system according to the invention, FIG. 3, an example of display, by the mobile B, of its means of display of the system according to the invention, FIG. 4, an example of orientation of the means of display of the mobile A with respect to North and to the new direction of progress of the mobile B.

A functional diagram of a system according to the invention is illustrated diagrammatically in FIG. 1.

The system according to the invention includes, arranged on the mobile A and the mobile B respectively:

a means of location, 1A, 1B, a means of display 2A, 2B, a means, for example a magnetometer, 3A, 3B indicating to the two mobiles A and B a common reference direction, for example North, and which is coupled to the means of display 2A, 2B, a computer 4A, 4B receiving the information output by the means of location 1A, 1B and by the magnetometer 3A, 3B, and a means of communication 5A, 5B of the data exchanged between mobiles A and B, which is coupled to the computer 4A, 4B.

One of the two mobiles, for example A, regarded as the leader of the combat group in respect of a combatant application, furthermore includes a facility 6 for inputting an angle θ, receiving the information output by the magnetometer 3A. The angle θ defines the correction to be made to the direction of progress of the mobile B so as to align with that imposed by A.

The system according to the invention can use various transmission media 7 for exchanging mobiles position and progress information such as for example hertzian, infrared, ultrasound transmission, etc.

Figure 2:
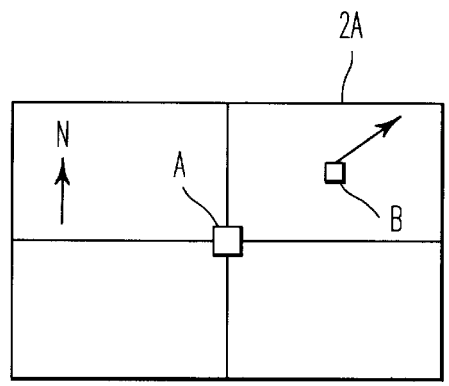

FIG. 2 illustrates an example of what the mobile A displays on the screen of its display means 2A. This screen is in this example of rectangular shape and quadrilled to form four identical rectangles. The centre of the screen displays the position of the mobile A, the upper right rectangle displays the position of the mobile B with respect to A as well as its progress depicted by an arrow, obtained on the basis of the last position received, of the speed or of the last progress indication received by B at the time of its confirmation by B. The upper left rectangle displays the direction of North.

As illustrated by FIG. 3, the mobile B displays on its display means 2B an arrow shown dashed in the figure, indicating its new direction of progress, given with respect to North; the new direction forming an angle $\theta_1$ with the direction of North.

As the mobile B has a magnetometer 3B coupled to its means of display 2B, B displays its new direction of progress $\theta_1$ as a function of the position of the screen of its means of display 2B with respect to North, without worrying about the orientation $\theta_2$ with respect to North of the means of display 2B, as illustrated in FIG. 4.

The mobile A knows the position of B obtained by the means of location 1B of B and transmitted by the means of communication 5B. The means of display 2B of B displays its last direction of progress received via the means of communication 5A and 5B and confirmed or displayed by itself.

The method used by A to indicate to B its new direction of progress is as follows illustrated briefly by FIGS. 5a and 5b: A has a magnetometer 3A. When A wishes to transmit to B a new direction of progress $\theta$ with respect to the old one, it manually swivels the arrow associated with the direction of displacement of B by the angle $\theta$, by way of its angle $\theta$ input facility 6, so as to bring it to the corresponding value and then triggers transmission.

The new direction of progress $\theta$ desired by A is transmitted, via the means of communication 5A and 5B respective to the two mobiles A and B, to the means 2B of display of B.

B then acknowledges its new direction of progress which is returned to A, via the communication means 5B and 5A respective to the two mobiles B and A.

The relative location of the mobile B with respect to the mobile A can be afforded by a satellite location system such as GPS, standing for "Global Positioning System", in differential mode (typical accuracy of between 2 and 5 m).

The locating means 1A and 1B respective to A and B are for example both equipped with a GPS receiver which regularly delivers their position; the communication means of A, 5A, thus enables A to receive, by way of the means 5B of communication of B, the position of B and thus to deduce therefrom the relative position of B with respect to A.

The communication means 5A and 5B respective to A and B consist for example of radio sets with a built-in 9600 bit/s modem. The information exchanged is transmitted for example at the following rate and throughput:

B transmits its position every second, i.e. 100 bytes or 800 bits maximum, and

A transmits a new direction every second maximum, i.e. 10 bytes or 80 bits maximum.

A protocol of random access type or of the TDMA access type, standing for "Time-Division Multiple Access", makes it possible to ensure the transmission of this information.

Finally, the display means 2A, 2B consist for example, of wrist terminals with a specific utilization depending on whether it is for mobile A or B.

In a variant of the system according to the invention, the locating means 1A and 1B include a direction-finding and distance-measuring system. The latter can for example be built into the modem of the communication means 5A and 5B.

Figure 6:
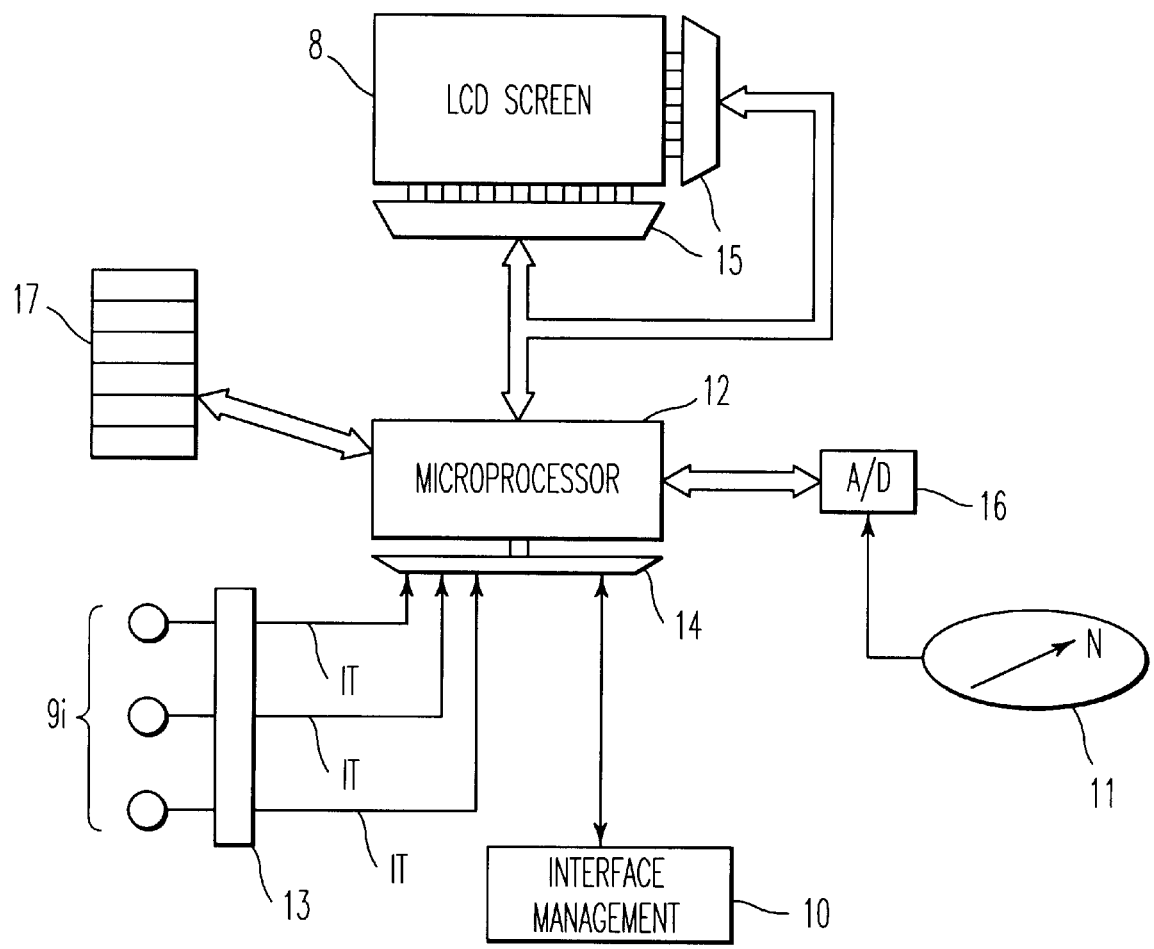

FIG. 6 illustrates the architecture of a wrist terminal of a system according to the invention and makes it possible to understand the operation thereof described below. This terminal is borne by the mobile A.

The terminal or watch is composed for example of:

an LCD screen 8 compatible with the size of the wrist, three input buttons, 9i an RS232 type interface 10 by way of which the send/receive of messages are transmitted to the communication means 5A, 5B respective to A and B.

The reception of messages brings about the display of information on the screen 8.

Moreover, the following facilities are built into the watch:

a magnetometer 11 which makes it possible to ascertain the direction of the watch with respect to North, a supply in the form of a disposable battery, not represented, and a processing unit 12, a microprocessor for example.

The buttons 9i form part of the input facility 6, not represented in this figure. When a button 9i is activated, an interface 13 manages the rebounds so as to avoid interference phenomena. An interrupt request IT is then dispatched to a module 14 termed the "IT vectorization module".

The module 14 manages the simultaneous arrival of several ITs at the microprocessor 12 by analysing a table of inter-IT priorities.

When the IT is received by the microprocessor 12, an IT-dependent program is initiated either by dispatching a cue to the RS232 interface 10 heading for the other terminal; or by displaying one or more specified icons on the screen 8.

When a message is received by the RS232 interface 10, an IT is dispatched to the microprocessor 12 which triggers a procedure enabling one or more corresponding icons to be displayed on the screen 8.

The display data of the screen 8 are transmitted to the screen by way of specific addressing interfaces 15.

The magnetometer 11 delivers an analogue signal which is converted into a digital signal by an analogue/digital converter 16 and the microprocessor 12 reads cyclically— every 100 ms for example—the angle delivered by the magnetometer 11.

The display is triggered by the microprocessor 12. Depending on the icon to be displayed, it will fetch the pixels to be activated from a ROM memory 17, standing for "Read Only Memory". If for one and the same display several icons are to be superimposed, the operator must not see a scintillation phenomenon.

Figure 7:
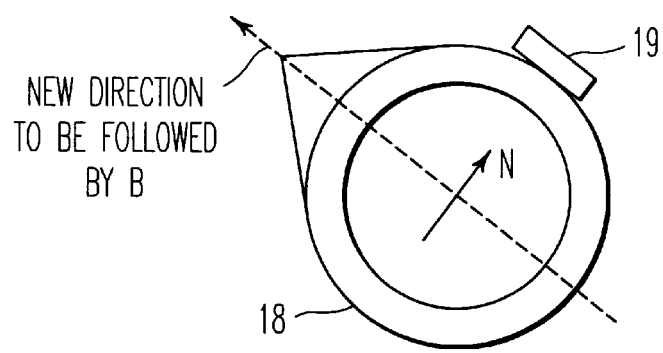

FIG. 7 illustrates the input of the new direction to be followed by the mobile A in respect of the mobile B for a compass/watch type terminal; the mobile A swivels the watch by the desired angle with respect to North.

Possible variants adapted to the system according to the invention without departing from the scope of the present invention are given below by way of example:

of the transmission means used (hertzian, infrared, etc.)

of the type of display means (pad computer) and of the way of restoring this display to the mobile (projection on the visor of a helmet in the case of a pedestrian)

of the means employed by A to display the direction of progress followed by B and of the locating means (beacon-based, GPS, relative location by direction-finding and distance-measurement, etc.).

Moreover, the display system of B can be replaced by a sound indication (speech synthesis, multidimensional sound, etc.).

FIG. 7 illustrates a terminal of the compass/watch type 18 on which is displayed an arrow giving the direction of North.

The mobile A swivels its watch by the desired angle with respect to North so as to reach the new direction to be followed and inputs this new direction, by way of the pushbutton 19 for the transmission of this new direction towards the mobile B.

We claim:

1. Navigation system allowing real-time coordination of the displacement of at least two distant mobiles travelling out of direct line of sight, characterized in that it includes a terminal arranged on each mobile respectively, each terminal including:

a means of location of the mobile, a means of display of its progress with respect to a common reference direction, a means which indicates to the two mobiles a common reference direction and is coupled to the display means, a means of communication of progress data, and a means of processing the information delivered by the means which indicates to the two mobiles the common reference direction, the locating means and the communication means so as to display the information on the display means, and in that at least one of the two mobiles furthermore includes:

a means of display of the progress of the second mobile with respect thereto, and a facility for inputting a specified angle defining a correction to be made to the direction of progress of the second mobile with respect to a new progress of the first mobile, this correction being transmitted to the second mobile by way of the communication means respective to the first and second mobiles.

2. System according to claim 1, characterized in that the means of display of each terminal includes a screen on which are displayed the positions of the mobiles with respect to the common reference direction.

3. System according to claim 1, characterized in that the screen of the terminal including the facility for inputting a specified angle, displays cyclically the relative position of the two mobiles and an indication of the progress of the second mobile.

4. System according to claim 1, characterized in that the screens of each terminal are liquid crystal screens whose size is compatible with the size of the wrist.

5. System according to claim 1, characterized in that the facility for inputting an angle consists of the display screen itself and which, on the basis of the last direction of progress of the second mobile and of the common reference direction, is oriented by a specified angle so as to make the direction of progress of the second mobile correspond with a new direction of progress imposed by the first mobile.

6. System according to claim 1, characterized in that the means of communication of each mobile includes a modem for hertzian-mode send/receive.

7. System according to claim 1, characterized in that the locating means of each mobile includes a direction-finding and distance-measuring system.

8. System according to claim 6, characterized in that the direction-finding and distance-measuring system is built into the modem.

9. System according to claim 1, characterized in that the locating means of each mobile includes a differential-mode satellite location system.

10. System according to claim 2, characterized in that the screen of the terminal including the facility for inputting a specified angle, displays cyclically the relative position of the two mobiles and an indication of the progress of the second mobile.

11. System according to claim 2, characterized in that the screens of each terminal are liquid crystal screens whose size is compatible with the size of the wrist.

12. System according to claim 3, characterized in that the screens of each terminal are liquid crystal screens whose size is compatible with the size of the wrist.

13. System according to claim 2, characterized in that the facility for inputting an angle consists of the display screen itself and which, on the basis of the last direction of progress of the second mobile and of the common reference direction, is oriented by a specified angle so as to make the direction of progress of the second mobile correspond with a new direction of progress imposed by the first mobile.

14. System according to claim 3, characterized in that the facility for inputting an angle consists of the display screen itself and which, on the basis of the last direction of progress of the second mobile and of the common reference direction, is oriented by a specified angle so as to make the direction of progress of the second mobile correspond with a new direction of progress imposed by the first mobile.

15. System according to claim 4, characterized in that the facility for inputting an angle consists of the display screen itself and which, on the basis of the last direction of progress of the second mobile and of the common reference direction, is oriented by a specified angle so as to make the direction of progress of the second mobile correspond with a new direction of progress imposed by the first mobile.

16. System according to claim 2, characterized in that the means of communication of each mobile includes a modem for hertzian-mode send/receive.

17. System according to claim 3, characterized in that the means of communication of each mobile includes a modem for hertzian-mode send/receive.

18. System according to claim 4, characterized in that the means of communication of each mobile includes a modem for hertzian-mode send/receive.

19. System according to claim 5, characterized in that the means of communication of each mobile includes a modem for hertzian-mode send/receive.

20. System according to claim 2, characterized in that the locating means of each mobile includes a direction-finding and distance-measuring system.

* * * * *

UNITED STATES PATENT AND TRADEMARK OFFICE
CERTIFICATE OF CORRECTION

PATENT NO. : 5,923,294
DATED : July 13, 1999
INVENTOR(S) : Olivier Bacelon, et al.

It is certified that error appears in the above-identified patent and that said Letters Patent is hereby corrected as shown below:

On the title page, item [73], the assignee's name should be:

--Thomson - CSF--

Signed and Sealed this

Sixteenth Day of May, 2000

Attest:

Q. TODD DICKINSON

*Attesting Officer*     *Director of Patents and Trademarks*